United States Patent [19]

Rowley et al.

[11] 4,053,685

[45] Oct. 11, 1977

[54] END-REACTING ELECTROCHEMICAL BATTERY

[75] Inventors: Leroy S. Rowley, San Jose; Harry J. Halberstadt, Los Altos, both of Calif.

[73] Assignee: Lockheed Missiles & Space Company Inc., Sunnyvale, Calif.

[21] Appl. No.: 470,132

[22] Filed: May 15, 1974

[51] Int. Cl.² .............................................. H01M 2/38
[52] U.S. Cl. ........................................ 429/68; 429/72; 429/206
[58] Field of Search .............. 136/6 R, 100 R, 100 M, 136/86 A, 83, 20; 429/67-70, 72, 206

[56] References Cited

U.S. PATENT DOCUMENTS

| | | | |
|---|---|---|---|
| 2,976,342 | 3/1961 | Morehouse et al. | 136/100 R |
| 3,401,063 | 9/1968 | Opitz | 136/100 R |
| 3,657,017 | 4/1972 | Ketler, Jr. | 136/100 R |
| 3,730,776 | 5/1973 | Geisler, Jr. | 136/100 R |
| 3,791,871 | 2/1974 | Rowley | 136/100 R |

*Primary Examiner*—C. F. LeFevour
*Attorney, Agent, or Firm*—Richard H. Bryer; Billy G. Corber

[57] ABSTRACT

In a reactive metal-water electrochemical battery, means for minimizing the destructive erosion of the reactive metal anode material on those anode surfaces not being actively employed in the operation of the battery. More particularly, in one embodiment, the non-working anode surfaces are maintained in intimate relationship with the battery casing to prevent the eroding electrolyte from contacting the non-working surfaces. In another embodiment, the electrolyte is confined to the working surface of the anode by means of flexible seals which protect the non-working surfaces.

1 Claim, 3 Drawing Figures

END-REACTING ELECTROCHEMICAL BATTERY

BACKGROUND OF THE INVENTION

This application describes and claims certain improvements in the electrochemical cell disclosed in U.S. Pat. No. 3,791,871.

The basic mechanism of operation of the cell described in the aforementioned patent is incorporated by reference in this application. Briefly, the cell utilizes a reactive metal anode highly reactive with a aqueous electrolyte and spaced from the cathode by an electrically insulating film which forms naturally on the anode in the presence of water. This thin film permits the cathode to be placed in direct contact with the anode. The resulting reduction in the anode-cathode spacing to a thickness no greater than the thickness of this thin film greatly reduces the $I^2R$ losses which would otherwise be present and results in increased power output and energy density. The anode and cathode operate in an aqueous electrolyte which supports the beneficial electrochemical reaction.

The aqueous electrolyte, however, also supports a parasitic chemical reaction with the non-working surfaces of the anode which reduces anode size and hence energy efficiency of the cell. Such parasitic loss results in no useful electrochemical reaction and is particularly serious where the area of the non-working anode surface is large in comparison to the area of the working surface.

SUMMARY OF THE INVENTION

Briefly, in accordance with the invention, there is described configurations for minimizing parasitic losses. More particularly, such losses are minimized by protecting the non-working surfaces of the anode from exposure to the aqueous electrolyte and thereby from destructive erosion of the non-working anode surfaces.

In one embodiment of the invention, the non-working anode surfaces are maintained in intimate and fixed relationship with the battery casing, thus restricting the electrolyte to essentially the desired working surface. The anode working surface is covered with the electrolyte and has a free-moving cathode contacting the insulating film covering the anode surface.

In another embodiment of the invention, the anode is free-moving relative to the battery casing and the anode working surface, having the insulating film thereon, is covered with the electrolyte and contacts a fixed cathode. Electrolyte is restricted to essentially the desired anode working surface by means of a flexible seal between the casing and the perimeter of the anode working surface.

In the first embodiment, the cathode follows the surface of the receding anode working face as the anode is consumed. In the second embodiment, the anode advances to maintain contact with the fixed cathode as the anode is consumed.

DESCRIPTION OF THE DRAWINGS

The various features and advantages of the invention will become apparent upon consideration of the following description taken in conjunction with the accompanying drawing of the preferred embodiments of the invention. The views of the drawing are as follows.

DESCRIPTION OF THE PREFERRED EMBODIMENTS

Figure 1:
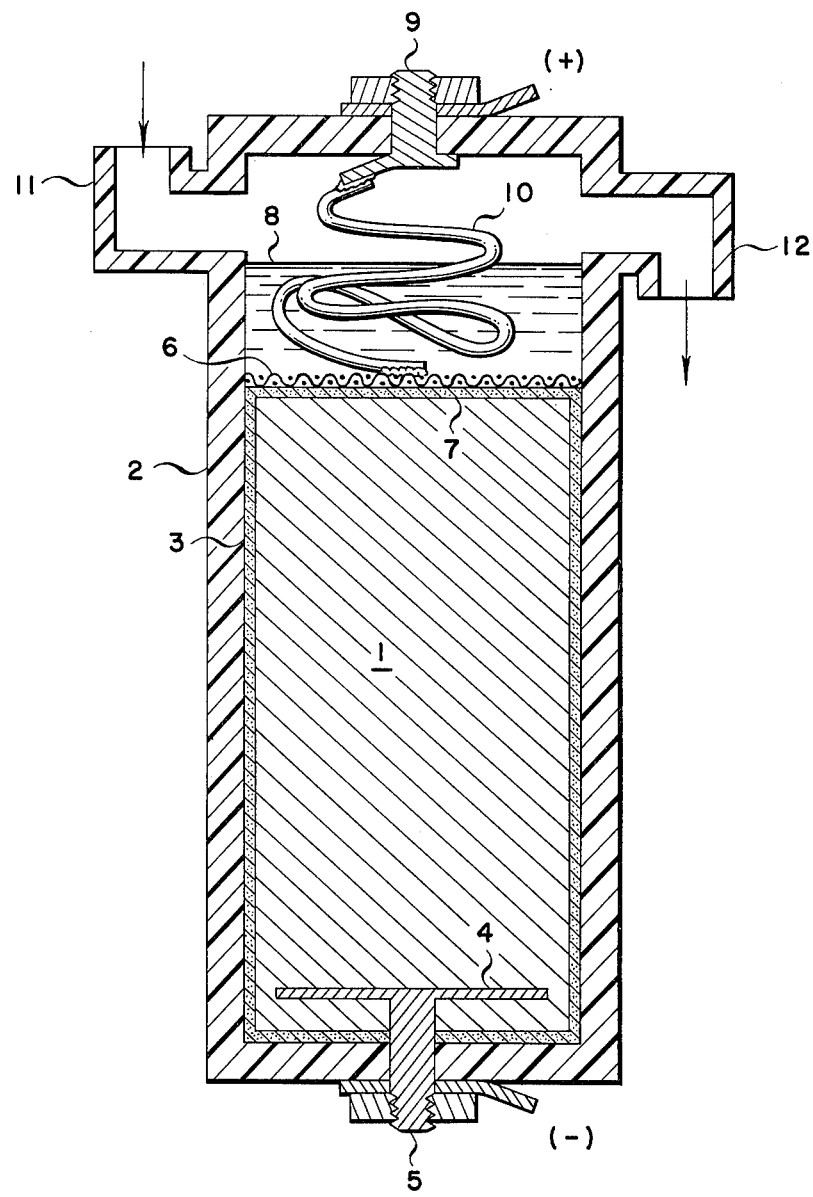
FIG. 1 is a side cross-sectional view of a single end-reacting battery of the invention where all anode surfaces, except the working anode surface, are protected from the corrosive electrolyte by being tightly against and in fixed relationship with the battery casing.

With reference to FIG. 1, there is depicted one embodiment of a single end-reacting battery of the invention. Reactive metal anode 1 is configured to be in intimate and fixed relationship with battery casing 2. Depicted layer 3, which may be merely the insulating film which naturally forms on the reactive anode in the presence of water, maintains this relationsip and restricts the electrolyte to essentially the anode working surface. Alternatively, layer 3 may be epoxy cement or other suitable bonding agents which are insoluble and non-reactive with the electrolyte. Where the casing is conducting, for example by reason of being metallic for strength and heat dissapation requirements, layer 3 may include the insulating film, with or without a separate bonding agent between the film and the casing. Where the casing is non-conductive, layer 3 may be the insulating film or a suitable bonding agent, with or without the film.

An anode connector 4 is imbedded in anode 1 permitting electricity to be conducted out of the battery through terminal 5. Screen cathode 6 contacts insulating film 7 on the working surface of anode 1 which together with electrolyte 8 supports the electrochemical reaction of the battery. Cathode 6 is connected to positive terminal 9 by means of flexible connector 10 which permits cathode 6 to follow the surface of the receding anode working face as the face is consumed by the electrolyte 8. Water and electrolyte are introduced to the battery through inlet 11 with excess electrolyte discharging through vent 12.

As described in the aforementioned U.S. Pat. No. 3,791,871, cathode 6 is an open-mesh metallic screen contoured to contact the anode film 7 over substantially the entire anode working surface. The screen is of any suitable electrically conductive material which is non-reactive with and permits electrochemical reduction of the electrolyte during operation of the battery. Typically, iron and nickel are utilized as screen materials. Anode 1 is formed of a reactive metal such as sodium and lithium and alloys and compounds of such metals which are highly reactive with water and in its presence naturally forms on the alloy surface a protective insulating film. The electrolyte 8 is a liquid solution in water of a reactive metal salt, such as alkali metal hydroxides, which, for cold water environments may desirably contain any recognized anti-freeze such as ethylene glycol to further reduce the freezing point of the electrolyte.

Figure 2:
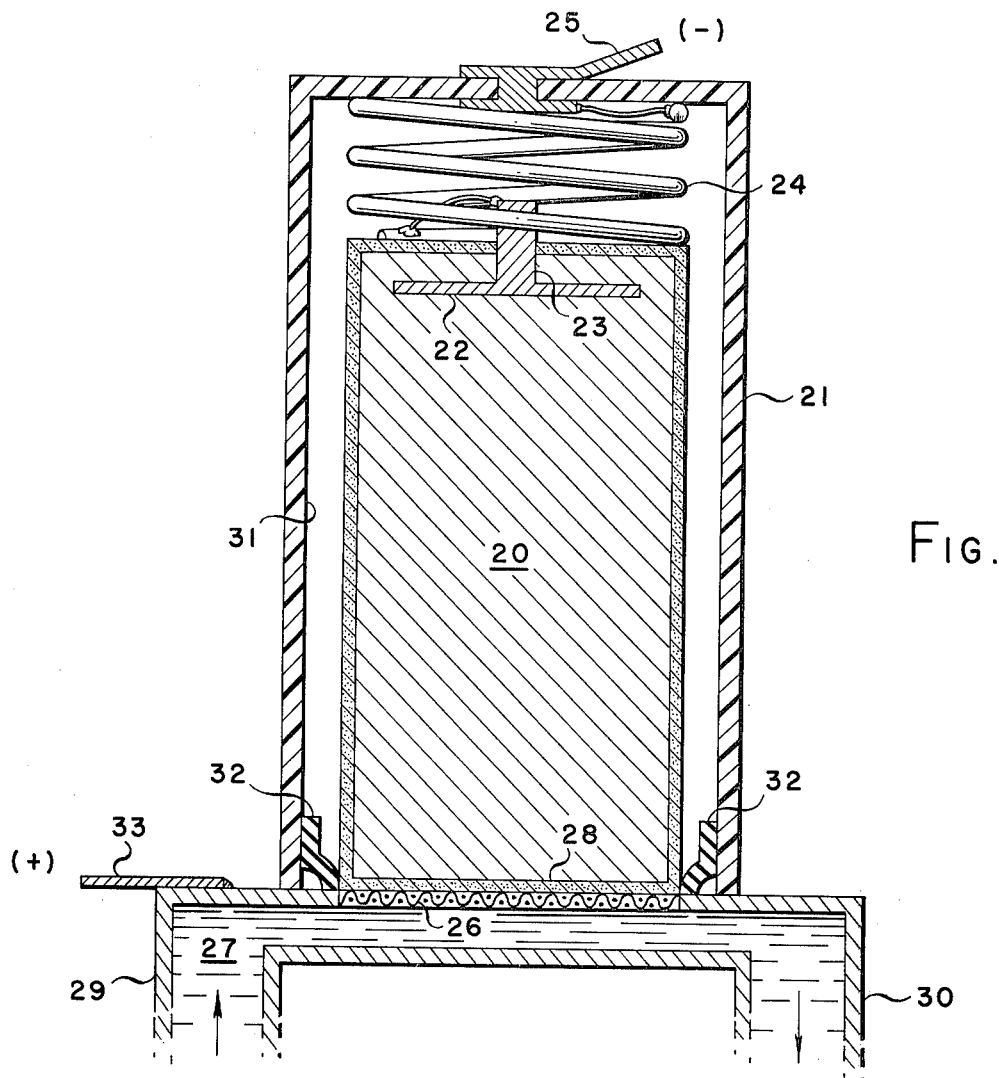
FIG. 2 is a side cross-sectional view of a single end-reacting battery of the invention where the anode is free-moving relative to the battery casing and all non-working anode surfaces are protected from the corrosive electrolyte by means of a flexible seal.

Illustratively, batteries in accordance with FIG. 1 and having the following characteristics were operated:

Small Battery: 1.0 volt; 20 to 120 ma with varying loads 0.025 inch rectangular cell, 3 inches long run times — 250 to 330 hours Large Battery: 1.0 volt; 1 to 1.5 amps per square inch 1.5 inch diam. round cell, 14 inches long run time — 35 hours With reference to FIG. 2, there is depicted another single end-reacting battery of the invention. Anode 20 is mounted in and free-moving with respect to battery casing 21. Anode connector 22 is imbedded in anode 1, thereby permitting electricity to be conducted out of the battery through stud 23 and flexible connector 24 to terminal 25. Flexible connector 24 may also serve to hold anode 20 firmly against cathode 26 as the working face of the anode is consumed by electrolyte 27 by moving the anode downward as it is consumed. Electrical shorting between anode 20 and cathode 26 is prevented by the naturally forming insulating film 28 on the anode 20. Electrolyte 27 enters the battery through inlet 29 and exits at vent 30. Entry of electrolyte 27 into cavity 31 between anode 20 and casing 21 is prevented by flexible seals 32 formed of materials such as rubber that are inert to the electrolyte. Cathode connector 33 provides the positive terminal of the battery.

Illustratively, batteries in accordance with FIG. 2 and having the following characteristics were operated:

| 1 Cell, 1 volt | 2 Cells, 2 volts |
|---|---|
| 10 sq. in. anode | 42 sq. in. anodes |
| 10 to 20 amps. | up to 150 amps. |
| | up to 21 hrs. at an average of 60 amps. |

Figure 3:
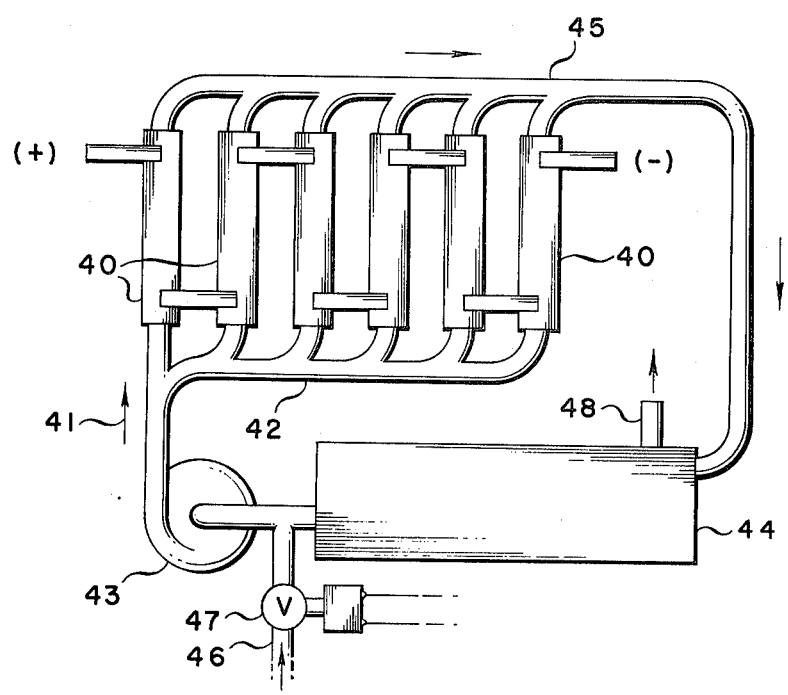
FIG. 3 is an edge view of a battery system of the invention utilizing a plurality of electrically connected batteries depicted in FIGS. 1 and 2.

With reference to FIG. 3, there is depicted a battery system composed of multiple batteries of the invention connected, in this embodiment, in series. For other embodiments, not shown, the multiple batteries may be electrically connected in parallel and a series-parallel arrangement. Circulating electrolyte 41 enters the series of batteries 40 through manifold 42 by means of pump 43 and exits therefrom to heat exchanger 44 by manifold 45. The feed water rate 46 is controlled by valve 47 which in turn is controlled by the total cell voltage. Excess electrolyte and hydrogen gas are exhausted through pipe 48.

As more particularly set forth in aforementioned patent 3,791,871, during operation of the battery molarity of the electrolyte increases with a resulting decrease in power out; hence, controlled water additions to the electrolyte during operation of the battery is desirable to maintain a desired power out. Heat exchanger 44 removes excess heat generated during operation of the battery system which otherwise would result in a loss of efficiency for the system.

Illustratively, a battery system in accordance with FIG. 3 and having the following characteristics was operated:

12 cell — 12 volt
6.5 × 6.5 inch anodes
50 to 100 amps variable load
15 hours operation

We claim:

1. In a reactive metal anode-aqueous electrolyte electrochemical battery wherein said anode is mounted in a battery casing and naturally forms on its surface a protective insulating film in the presence of water, the improvement wherein:
    a. said protective insulating film includes at least a portion thereof comprising a reactive surface,
    b. a cathode in direct contact with substantially the entire reactive surface,
    c. means preventing said electrolyte from contacting any portion of said anode other than said reactive surface, thereby minimizing destructive erosion of said anode by said electrolyte in a non-power producing area of said electrolyte wherein said preventing means comprises said battery casing said battery case being in intimate and fixed direct contact with all surface portions of said anode other than said reactive surface, and
    d. means for maintaining said cathode in direct contact with said anode as said anode is consumed, said cathode being freely movable with and following the receding anode reactive surface for maintaining direct contact between said reactive surface and said cathode.

* * * * *